C. R. MIDDLETON.
CUTTING TOOL FOR PLANERS, LATHES, &c.
APPLICATION FILED DEC. 22, 1908.
936,793.  Patented Oct. 12, 1909.
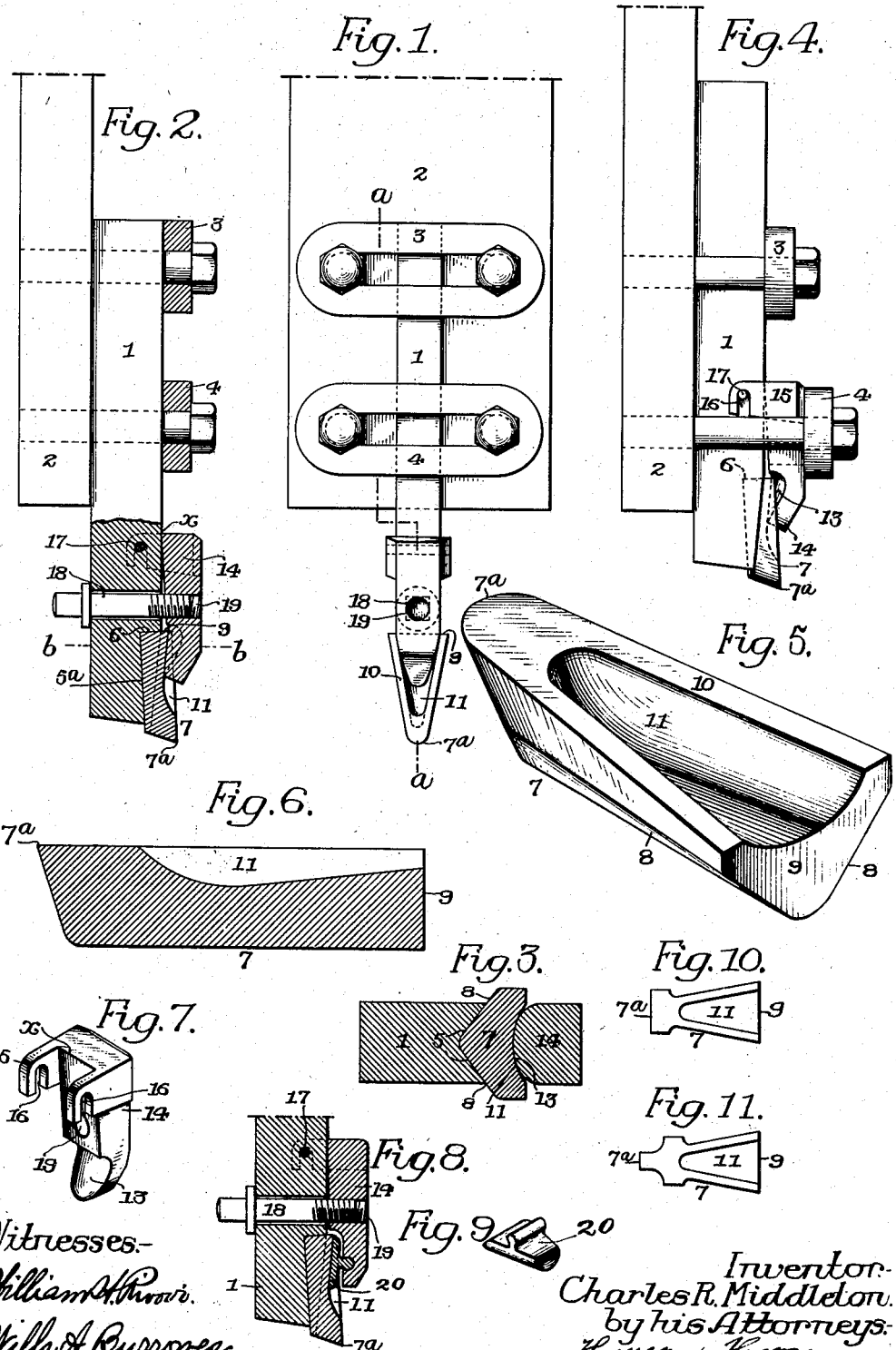
Witnesses:—
William H. Prior.
Wills H. Burrowes.
Inventor:—
Charles R. Middleton.
by his Attorneys:
Howson & Howson

UNITED STATES PATENT OFFICE.

CHARLES R. MIDDLETON, OF PHILADELPHIA, PENNSYLVANIA.

CUTTING-TOOL FOR PLANERS, LATHES, &c.

936,793.         Specification of Letters Patent.         Patented Oct. 12, 1909.

Application filed December 22, 1908. Serial No. 468,846.

*To all whom it may concern:*

Be it known that I, CHARLES R. MIDDLETON, a citizen of the United States, residing in Philadelphia, Pennsylvania, have invented certain new and useful Improvements in Cutting-Tools for Planers, Lathes, &c., of which the following is a specification.

My invention relates to cutting-tools for use on planers, lathes etc. and consists of a tool having interchangeable cutting points.

One object of my invention is to provide a tool of the above mentioned class which will be strong and durable, thereby rendering it particularly adaptable to heavy cutting.

Another object is that the several parts will be easy of adjustment and that the entire structure may be manufactured at a nominal cost.

These objects I attain in the following manner, reference being had to the accompanying drawings in which:—

Figure 1, is a front view of my invention fixed to the carriage of a planer; Fig. 2, is a section on the line *a—a*, Fig. 1; Fig. 3, is an enlarged transverse sectional view on the line *b—b*, Fig. 2; Fig. 4, is a side elevation showing the tool raised and the planer apron clamp acting as the means for retaining the cutting point; Fig. 5, is a perspective view of a cutting point; Fig. 6, is a longitudinal section of the same; Fig. 7, is a perspective view of a yoked clamping member which I employ; Fig. 8, is a modified form of the clamping means; Fig. 9, is a perspective view of a clamping shoe for use in the modification, Fig. 8; and Figs. 10 and 11 are views of cutting points having different styles of cutting faces.

Cutting tools such as are used on large planers, lathes etc. for heavy cutting, have to be made of special quality steel and as the only really successful ones have been those constructed from a single bar of steel which is very expensive, it will be readily seen that with so many different styles of cutting faces necessary, the cost of the same would be enormous.

There have been cutting tools made heretofore, in which only their cutting faces or points are made of the special cutting steel but on account of their construction they are too weak to stand the strain of taking a heavy cut. In the case of the present invention, while the tool is in this latter general class, its construction is such that it may be used for making heavy cuts and is generally available for the work upon which the previously used tools were unsatisfactory.

Referring to the drawings, 1 represents the bar or body portion of the tool which is clamped to the carriage 2 of a planer by the usual apron clamps 3 and 4.

The lower end of the bar 1 is provided with a V-shaped groove 5, the bottom $5^a$ of which runs at an angle to the front face of the bar 1 and stops abruptly at 6 forming a shoulder. This V-shaped groove 5 is for the reception of a cutting point such as 7 which may have any style cutting face $7^a$.

The side 8 of the cutting point 7 is wedge-shaped so as to fit in the V-shaped groove 5 in the bar 1, and has its end 9 abutting the shoulder 6. The side 10 opposite the side 8 is "dished" at 11 for the reception of the curved tongue 13 of the clamping member 14. This clamping member 14 has extensions 15 for the purpose of straddling the bar 1; said extensions being slotted at 16 to fit over a pin 17 in the bar 1.

A bolt 18, passing from rear to front through the bar 1, is threaded at its outer end and enters a tapped hole 19 in the clamping member 14.

In assembling the parts of the device, the desired cutting point is placed within the groove 5; the curved tongue 13 is pressed within the "dished" portion 11 of the point 7 so that the bolt 18 may enter the tapped hole 19 thereby rigidly holding the point between the clamping member 14 and the bar 1. The cutting point is prevented from turning or twisting by the wedge shaped face 8 snugly fitting the V-shaped groove 5 in the bar 1 and also by the curved face 13 of the clamp 14 fitting the recess 11 of the said point 7.

The bar 1 extending nearly the whole length of the cutting point forms a positive backing; while the shoulder 6 acts to prevent movement due to the upward thrust of the point in the groove 5 during its operation.

The bottom of the dished portion 11 runs at an angle with the bottom $5^a$ of the groove 5 and it will be readily seen that when held between the bar 1 and the clamping member 14 the part of the cutting point between them will form an inverted wedge. With the fulcrum of the clamping member 14 at *x* and an entire surface contact between the bar 1 and the side 8 of the cutting point 7 and between the clamping member 14 and the "dished" portion 11 of the cutting point, great pressure can be exerted upon the latter by said clamping member, thereby rigidly retaining the cutting point in place.

When it is desired to remove the cutting point the bolt 18 is unscrewed and thereby causes the clamping member 14 to release its hold.

As the cutting face wears, a block of metal may be inserted between the shoulder 6 and the end 9 of the cutting point so as to keep said cutting face at the proper distance from the end of the bar 1.

By having the clamping member 14 suspended from the pin 17, as it is when not in use, it is always in the correct position for clamping when a cutting point is inserted.

When cutting a plane surface or one which will allow the planer carriage to travel close to the "work" I may dispense with the bolt 18, by raising the bar 1 and using one of the apron clamps to act upon the clamping member 14 as is shown in Fig. 4.

While in the several views of the drawings I have shown my device attached to a planer, it can be used with advantage upon other machines such as lathes, slotters and milling machines.

In the modification (Fig. 8) I have shown a shoe 20 movably mounted between the clamping member 14 and the cutting point. Said shoe is free to adjust itself to said cutting point so as to insure its accommodation to any irregularity which may exist in said parts.

I claim:

1. The combination of a cutter bar having a groove of substantially V-shaped section terminating abruptly in a shoulder, a cutting point fitting said groove and abutting on said shoulder, said cutting point having a recess, with means acting within the recess for holding said point to the cutter bar.

2. The combination of a cutting tool holder having a groove of substantially V-shaped section formed with its bottom running at an incline with the line of cut and terminating in a shoulder, a cutting tool fitting said groove and abutting on the shoulder, there being a central and longitudinally extending recess in the outer surface of the cutting tool, said recess increasing in depth toward the cutting end of the tool and having its bottom running at an angle to the bottom of the groove, with a clamp acting within the recess for securing the tool to the holder.

3. The combination of a cutter bar, having a groove of substantially V-shaped section, a cutting point fitting said groove and decreasing in width toward its cutting end, there being a longitudinally extending recess in the outer surface of the cutting point, said recess increasing in depth toward the cutting end of the cutting point, a clamp acting within the recess with means acting upon said clamp for securing the cutting point to the cutter bar.

4. The combination of a cutter bar having a groove of substantially V-shaped section terminating in a shoulder, a cutting point fitting said groove and abutting on said shoulder, said cutting point being provided with a longitudinally extending recess having its bottom running at an angle to the bottom of the groove, a lever fulcrumed on the cutter bar and bearing upon the bottom of the recess, with means acting upon said lever to rigidly secure the cutting point to the cutter bar.

5. The combination of a cutter bar having a groove and provided with projections, a cutting point fitting said groove, a clamp hung from said projections for holding said cutting points in position, and a bolt holding the clamp to the cutter bar.

6. The combination of a cutter bar having a substantially V-shaped groove, terminating in a shoulder, a cutting point fitting said groove and abutting on said shoulder, said cutting point increasing in width rearwardly from its cutting end, a clamp engaging said point with means acting upon said clamp to hold the cutting point to the cutter bar.

7. The combination of a cutter bar, a cutting point, a clamp for holding the point to the cutter bar, means for rigidly holding the clamp to said cutter bar, and means for supporting the clamp independently of the said holding means when the cutting point is removed.

8. The combination, in a cutting tool, of a cutter bar having a groove of substantially V-shaped section formed with its bottom running at an incline to the line of cut of the tool and terminating in a shoulder, a cutting point fitting said groove and abutting on said shoulder there being formed in said cutting point a recess curved in cross section and having its bottom at an angle to the bottom of the groove, with means acting upon the bottom of the recess for equalizing the pressure of the cutting point upon each side of the groove to rigidly secure said point to the cutter bar.

9. The combination of a cutter bar, a cutting point, and a clamping device for retaining the cutting point to the cutter bar, with projections on the sides of the cutter bar, and lugs on the clamping device engaging said projections for supporting said device when the tool is removed.

10. The combination in a cutting tool of a cutter bar having a groove of substantially V-shaped section terminating in a shoulder, a cutting point fitting said groove and abutting on said shoulder, there being a recess in said cutting point formed with its bottom running at an angle to the bottom of the groove, a lever fulcrumed on the cutter bar and bearing within the recess, the portion of the cutting point between the lever and the bottom of the groove being in the form of an inverted wedge, with means acting upon said lever to secure the cutting point to the cutter bar.

11. The combination of a cutter bar having a groove of substantially V-shaped section terminating in a shoulder, a cutting point fitting said groove and abutting said shoulder, said point having a recess running at an angle to the bottom of said groove, and means acting upon said point within the recess, to hold it to said bar.

12. The combination of a cutter bar having a groove of V-shaped section terminating in a shoulder, a cutting point fitting said groove and abutting on the shoulder, said cutting point being of substantially the same length as the groove and having a recess in its outer surface running at an angle to the bottom of said groove, with means acting within the recess to clamp said cutting point to said bar.

In testimony whereof, I have signed my name to this specification, in the presence of two subscribing witnesses.

CHARLES R. MIDDLETON.

Witnesses:
    AUGUSTUS B. COPPES,
    WM. A. BARR.